Aug. 6, 1929.                C. H. WRIGHT                1,723,640
                              LIMITED CHECK
                          Filed Sept. 19, 1924        2 Sheets-Sheet 1

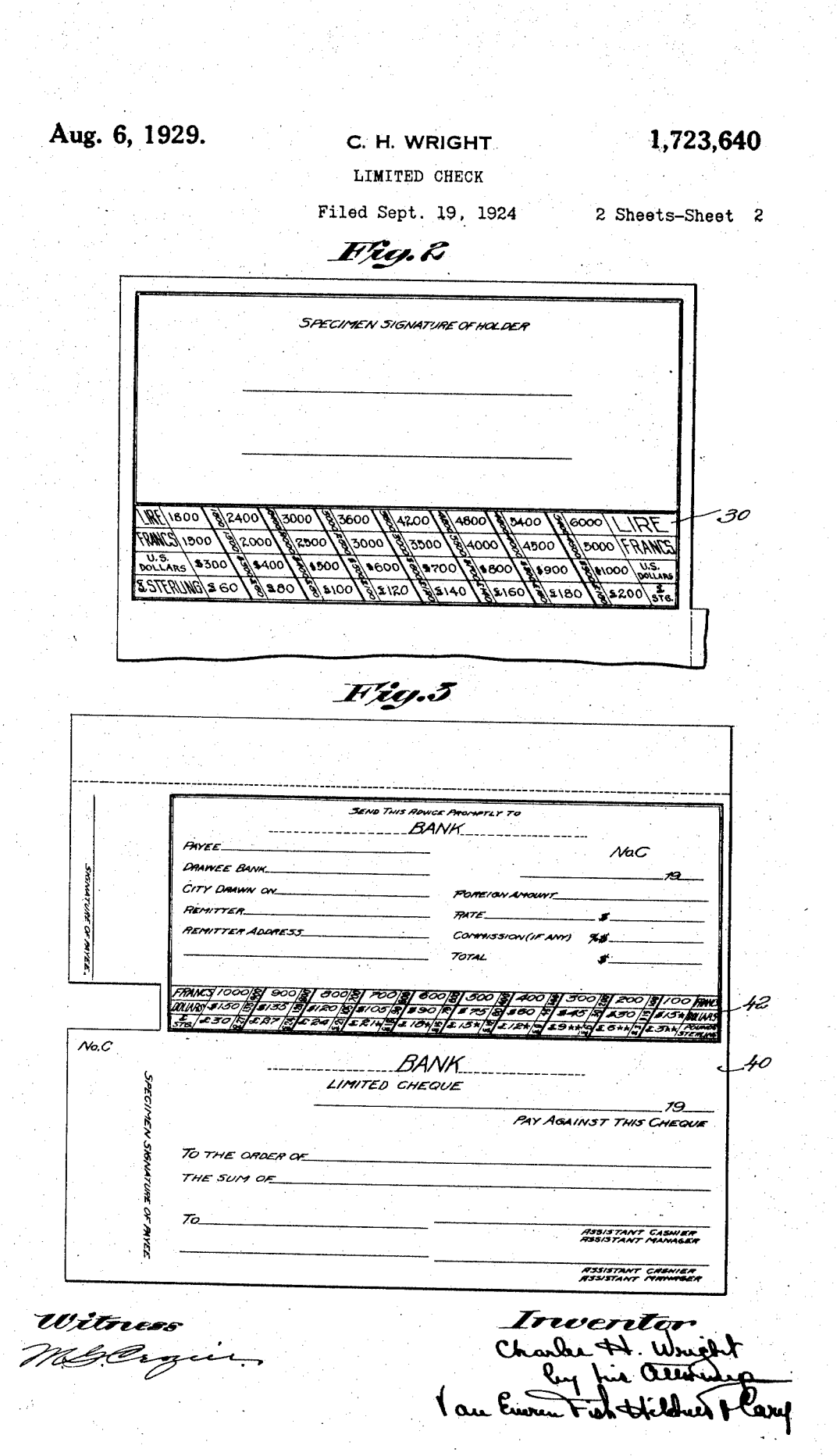

Aug. 6, 1929.  C. H. WRIGHT  1,723,640
LIMITED CHECK
Filed Sept. 19, 1924   2 Sheets-Sheet 2

Patented Aug. 6, 1929.

1,723,640

UNITED STATES PATENT OFFICE.

CHARLES H. WRIGHT, OF BROOKLINE, MASSACHUSETTS.

LIMITED CHECK.

Application filed September 19, 1924. Serial No. 738,588.

The present invention relates to letters of credit, checks and similar written instruments which are protected against alteration in the body of the instrument.

Letters of credit are frequently issued with the guarantee of an internationally known banking company, although the issuing bank may be a relatively small and unknown corporation at a point remote from the location of the guarantor. These credits when issued by the smaller or correspondent banking company are payable in a designated currency to the payee noted in the body of the instrument and without previous advice to the guarantor. Upon the issuance of the letter of credit or similar instrument, the issuing bank or trust company advises the guarantor relative to the amount of the credit, the name of the payee, and any other essential facts. It is of great importance in instruments of this character that the largest amount for which the credit may be cashed be positively indicated in such a manner that it cannot be altered or raised and that in addition the advice from the correspondent bank to the guarantor be also protected in order to prevent any liability of fraud on the part of employees of the issuing bank.

According to the present invention, a letter of credit or similar written instrument is provided with a letter of advice formed as a part thereof and having a protective guard interposed between the body of the instrument and the advice in such a manner that the operation of detaching the advice and protecting both the letter of credit and the advice is accomplished in a single operation. After separating the advice from the letter of credit, the protective margin attached to each portion of the instrument indicates the largest amount for which it may be cashed.

Referring to the accompanying drawings, Fig. 1 illustrates a plan view indicating the face of a letter of credit with the advice and protective guard formed therewith; Fig. 2 is a detail illustrating the opposite face of the advice and marginal guard; and Fig. 3 is a plan view of a limited check embodying certain features of the letter of credit.

As illustrated in the drawings, the body portion 10 of the letter is provided with the usual blanks for insertion of the date, the name of the payee, the name of the issuing bank, the total amount of the credit, and the currency in which it is payable. The instrument has also endorsed thereon a guarantee of a bank having international connections and presumably known at the places in which the letter of credit is to be cashed. This endorsement is indicated on the body of the credit at 11. The letter of credit is usually provided with two leaves hinged at 13, the inner portion of the credit when open containing spaces for entry of the amounts paid under the terms of the credit, and the name of the payee and the banks at which paid. All of these notations are usual in letters of credit and are shown herein.

According to the present invention, the body of the written instrument is provided with a protective marginal guard formed integral therewith and written in the various currencies for which the letter of credit may be issued. Attached to the guard and projecting from the opposite side or margin is a letter of advice to be detached and forwarded by the issuing bank. In the illustrated embodiment of the invention, the marginal guard is formed upon the upper edge of the body of the instrument and is written in lire, francs, dollars and pounds (sterling). The various progressively increasing amounts in each currency are arranged in lines parallel to the margin of the credit and corresponding amounts in different currencies are superimposed above one another in blocks spaced by diagonal lines. The arrangement is such that the guard may be detached to indicate the desired amount in any given currency by separating the guard along straight and diagonal lines with a paper cutter having an oblique angle corresponding to the angle of inclination between the lines. Increasing amounts in each currency are indicated from right to left. The amounts in different currencies are so arranged and determined that detachment of the guard to limit the amount payable in any given currency will not permit alteration of the instrument to provide for payment of a larger amount in a different currency. For example, if the credit is issued for an aggregate amount not exceeding 2000 francs, the guard would be detached along the horizontal line indicated at 20, the oblique line 21, and the lower horizontal line 22. At the usual rates of exchange, this amount would be substantially as great or greater than the largest amounts indicated in either dollars or pounds (sterling) remaining on the guard. It will be evident that these amounts are respectively $400 and £80. Obviously, fluctuating rates of exchange might necessitate changes in the limiting amounts. Attached to the marginal guard and formed integrally therewith is a letter of advice directed to the guarantor containing the name of the payee, the aggregate amount of the credit, and the currency in which it is drawn. When the marginal guard is properly severed, the remainder of the guard attached to the letter of advice indicates and limits the amount payable in the letter of credit. It will be evident from an inspection of Fig. 1 that the small blocks 24 contain amounts corresponding to the limiting amount on the letter of credit. Furthermore, the reverse side of the letter of advice is provided with a protective guard indicated at 30 in Fig. 2 which registers with the opposite side of the guard shown in Fig. 1 and shows the largest amount for which the credit is drawn, corresponding with the largest amount indicated upon the letter of credit.

The provision of such a guard is exceedingly important, as it not only prevents alteration of the letter of credit by the payee but also prevents any fraud upon the part of the employees of the issuing bank. In other words, an employee of the issuing bank is prevented from issuing a letter of credit for a certain stipulated amount and thereafter advising the guarantor bank that a credit has been issued for a smaller amount, as the advice must indicate an amount commensurate with that shown upon the protective guard. It will be noted that the reverse side of the advice also contains a space for the specimen signature of the holder or payee.

Fig. 3 illustrates a form of limited check having embodied therein a letter of advice and a protective guard. As indicated, the body of the check 40 contains spaces for the name of the payee, the amount of currency for which the check is drawn and the name of the issuing bank. The protective guard formed integrally therewith, as indicated at 42, is designed to provide for the issuance of the check in francs, dollars or pounds (sterling), the arrangement of the guard being similar to that shown in the letter of credit, the progressively increasing amounts in each currency being included between lines parallel to the guard and similar amounts in similar currencies being included between oblique lines. The letter of advice which may be detached with the severing of the protective guard contains spaces for filling in the desired information to be forwarded to the guarantor bank. In this case, the incorporation of the protective guard in the limited check and letter of advice prevents alteration or fraud either by the holder of the check or an employee of the issuing bank.

It will be evident to those skilled in the art that the protective guard may be designed to limit amounts in any desired number of currencies or in a single currency only. The arrangement of spaces within the guard may be varied without departing from the essential intent of the present invention. Although the illustrated embodiment of the invention has been shown in connection with a letter of credit and limited check, certain features of the invention are undoubtedly applicable to other written instruments which call for the payment of stipulated sums at points remote from the location of the issuing agency.

I claim:

1. A letter of credit comprising a body portion having a space marked for the entry of the name of the issuing bank and provided with appropriately designated blanks for the entry of the name of the payee and the amount for which the instrument is written, an advice portion forming a part thereof and designed to be forwarded by the issuing bank to a second bank and containing appropriately designated spaces for entry of the name of the payee and the amount for which the instrument is written, and a protective guard interposed between the body portion and advice portion and having a series of graduated amounts in duplicate in different currencies written between the adjacent margins of the body portion and advice portion, the progressively increasing duplicate amounts in each currency being arranged in blocks between lines parallel to the long margins of the guard with duplicate amounts in adjacent blocks, and approximately corresponding amounts in different currencies being superimposed one above another in diagonally arranged blocks to permit severing the guard along lines indicating the largest amount for which the instrument is written on both the advice and body portion.

2. A letter of credit comprising a body portion having a space marked for the entry of the name of the issuing bank and having appropriately designated blanks for the entry of the name of the payee and the amount for which the instrument is written, an advice portion forming a part thereof, and a comparatively narrow protective guard interposed between the body portion and advice portion and extending lengthwise of the body portion, the guard having a series of graduated amounts in duplicate in different currencies written between the adjacent margins of the body portion and advice portion, the progressively increasing amounts in each currency being arranged in blocks between lines parallel to the long margins of the guard with duplicate amounts in adjacent blocks, and approximately corresponding amounts in different currencies being in superimposed blocks to permit severing the guard along lines indicating the largest amount for which the instrument is written on both the advice and body portion.

In testimony whereof I have signed my name to this specification.

CHARLES H. WRIGHT.